May 17, 1966    A. SERDECHNY    3,251,260

ADJUSTABLE LENGTH FASTENER

Filed Nov. 4, 1963

INVENTOR.
ALEXANDER SERDECHNY
BY
Mc Cormick, Paulding & Huber
ATTORNEYS

United States Patent Office 3,251,260
Patented May 17, 1966

3,251,260
ADJUSTABLE LENGTH FASTENER
Alexander Serdechny, 697 Burnham St.,
East Hartford, Conn.
Filed Nov. 4, 1963, Ser. No. 321,214
2 Claims. (Cl. 85—7)

The present invention relates to new and useful improvements in fastening devices, and more particularly to a two-piece fastener of adjustable length for binding together a stack of perforated paper sheets or other similar articles.

The general object of this invention is to provide a relatively low cost yet sturdy fastener for releasably or permanently joining together two or more articles having openings through which the fastener may be passed.

Another object of the present invention is to provide a two-piece fastener which can be readily adapted to join a plurality of perforated sheets or the like into a bundle of a particular thickness, the length of the fastener being easily adjusted to the thickness of the resulting bundle.

Another object of the present invention is to provide a two-piece fastener in which the separable parts are axially retained in their assembled positions by a detent or gripping action between the two parts and may be separated by applying a parting force roughly equivalent to the force required to assemble said parts.

Still another object of the present invention is to provide a two-piece fastener in which the parts after assembly are axially retained in their assembled positions in such a manner as to provide high resistance to the separation thereof.

A still further object of the present invention is to provide a two-piece fastener in which the parts thereof are axially retained in an assembled condition by a holding force roughly proportional to the particular thickness of the bundle of sheets joined by the fastener.

The drawing shows the preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Figure 1:
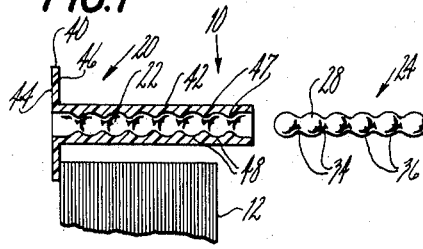
FIG. 1 is a view of a two-piece fastener of the present invention, this view showing the parts of the fastener in their initial disassembled condition and a bundle of sheets to be joined, the female part of the fastener being shown in section and the male part being shown in elevation.
Figure 2:
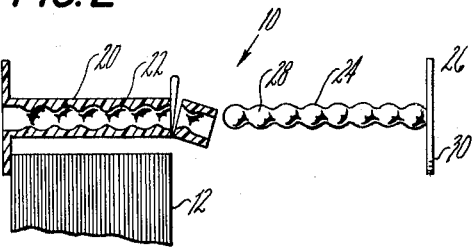
FIG. 2 is similar to FIG. 1 but shows the female part of the fastener being cut to the proper length for use with the illustrated bundle.
Figure 3:
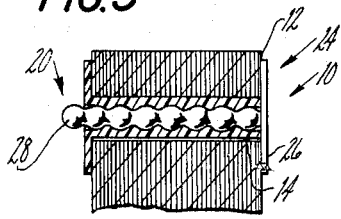
FIG. 3 is a view showing the FIG. 1 fastener in an assembled condition with respect to the illustrated bundle and before the protruding end portion of the male member is cut therefrom.
Figure 4:
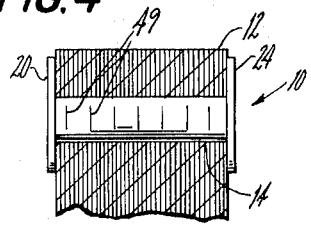
FIG. 4 is a view similar to FIG. 3 but showing the assembled condition of the fastener after the removal of the protruding end of the male member and also showing the female member in elevation.
Figure 9:
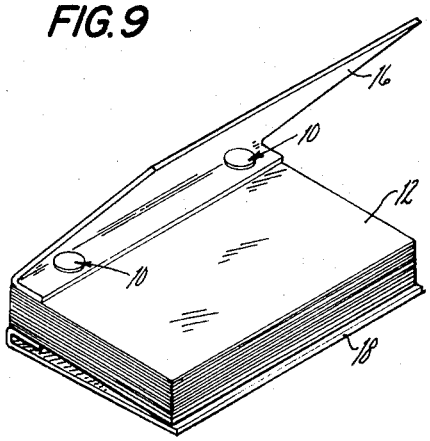
FIG. 9 is a perspective view showing a particular application of the fastener of FIG. 1.
Figure 10:
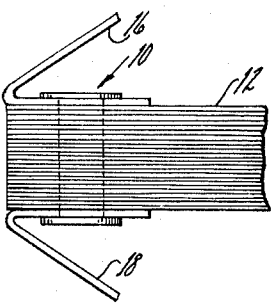
FIG. 10 is a fragmentary end view of FIG. 9.

FIGS. 1 to 4 show one preferred embodiment of a two-piece fastener 10 made in accordance with the present invention and also illustrate the convenient manner in which the fastener can be used to join a plurality of paper sheets into a compact and neat bundle such as shown at 12. As shown in FIGS. 3 and 4, the sheets comprising the bundle 12 have openings therethrough which are adapted to being aligned to provide an opening 14 through the bundle to receive the various parts of the fastener 10. While these sheets may be standard notebook size punched paper sheets the invention is not necessarily limited to the joining of such sheets but may be used to advantage in joining many other different articles having openings for receiving a fastener. In this vein, FIGS. 9 and 10 show a fastener 10 used not only to join a bundle of perforated paper sheets 12 but also to join front and rear semi-rigid covers, 16 and 18 respectively, to the bundle in a conventional arrangement. It will be apparent that other materials may be so joined by the fastener 10 provided only that they be in sheet form and that they have alignable openings therein.

Turning now to the construction of the fastener shown in FIGS. 1 to 4, this device will be seen to comprise a female member 20 adapted to receive a male member 24 so shaped as to be capable of being forcibly inserted into the same.

Considering first the male member 24, this member includes a head portion 26 and an elongated shank portion 28. The head portion 26 may take various different shapes, but preferably and as shown is substantially in the shape of a relatively thin and flat circular disc so as to have a flat outer surface 30, which is perpendicular to the shank portion 28, and a flat inner or clamping surface 32 which is parallel to said outer surface 30 and closely spaced therefrom. One advantage of a relatively thin flat head can best be understood by reference to FIGS. 4, 9 and 10 wherein the fastener 10 is seen to protrude only slightly beyond the thickness of the bundle 12. Also, as will be evident from FIGS. 9 and 10 the thin head also allows the use of the type of covers therein illustrated and permits the covers to close flatly on the bundle 12 without undue interference with the fastener. The shank portion 28 is shaped to define a plurality of beadlike protuberances or nodules which are axially spaced and integrally joined to one another along the length of the shank in a uniform pattern so as to form alternate portions of reduced and enlarged diameter, the reduced diameter portions being shown at 34, 34 and the enlarged diameter portions being shown at 36, 36.

The female member 20 includes a thin disclike head portion 40 similar to the head portion 26 of the male member and also includes an elongated shank portion 42. The head portion 40 has a flat outer end surface 44 and a flat inner or clamping surface 46. Like the male head portion 26 the female head portion 40 is relatively thin axially for the reasons set forth hereinabove. The female shank portion 42 is generally cylindrical in external contour and therefor adapted to being received in the aligned openings of the sheets making up the bundle 12. An opening 22 extends axially through the entire length of the female member 20 including both the head portion 40 and the shank portion 42. Along its length the opening 22 is shaped to as to define alternate portions of reduced and enlarged diameter which are complementarily related to the similar portions of the male member shank portion 24, the reduced diameter portions being shown at 47, 47 and the enlarged diameter portions being shown at 48, 48. In both the male and female parts the difference in diameter between the alternate reduced and enlarged diameter portions and the resiliency of the parts are so selected that upon forcible insertion of the male member into the female member the parts will resiliently deform to allow the enlarged diameter portions 36, 36 of the male member to move over the reduced diameter portions 47, 47 of the female member until the male member reaches a desired axial position relative to the female member whereat some or all of the reduced diameter portions 47, 47 of the female member engage corresponding reduced diameter portions 34, 34 of the male member to resist disassembly of the parts.

As shown in FIGS. 1–4 the reduced and enlarged diameter portions of both the male and female members extend the full length of said members and therefore it will be obvious that the longer the two parts and the further the male member is inserted in the female member the greater will be the force resisting disassembly. The advantage of such a construction is obvious, since the need for a stronger fastener is generally directly related to the size or thickness of the bundle of sheets to be joined. To obtain a maximum holding force both parts of the fastener should be initially at least as long as the combined thicknesses of the sheets to be joined.

In accordance with a specific aspect of the preceding invention it is therefore preferred that the male and female parts of the fastener both be made initially longer than the thickness of the bundle to be joined and be made of such material as to be readily cut to a length equivalent to the bundle thickness. While various different materials may be employed any material which is used should be soft enough so as to be readily manually cut with a knife blade, such as shown at 50 in FIG. 2, or with a pair of scissors. The term "readily cut material" as used herein is therefore intended to carry this connotation. Various different soft plastics are very satisfactory for use in making the fastener.

Considering the method of using the fastener 10, the female shank portion 42, if longer than the thickness of the bundle 12, is first cut, as shown in FIG. 2, to the length dictated by the bundle thickness. The female member is then inserted in the opening 14 in the bundle, and thereafter the male member is forcibly inserted into the female opening 22 until the head portion 26 engages or is moved as close as possible to the severed end of the female shank 42, as shown in FIG. 3. At this point it should be noted that it is desirable that the severed end of the female shank does engage the head of the male member after assembly of the parts so that the assembled fastener will have a constant diameter betweeen the two heads 26 and 40. Due to the shape of the parts, however, the male member may be moved only to a number of discrete positions relative to the female member which positions are spaced from one another by a distance equal to the distance between successive points of minimum diameter. Therefore, it is desirable that the outer surface of the female shank portion 42 be provided with axially spaced markings, which may be in the nature of shallow circumferential grooves or painted lines 49, 49, indicating the points at which the female shank may be cut to provide the desired engagement of the shank end with the male head 26.

It will be apparent that the insertion if the male member will be accomplished in a series of steps and that the male member will be releasably held between these steps in a number of intermediate positions between those shown in FIG. 2 and FIG. 3. It will also be apparent that as the male member is pushed further into the female member the greater will be the force tending to hold the male and female members in assembled relation.

After the male member is fully inserted into the female member, as shown in FIG. 3, the outer end of the male shank 28 will protrude beyond the female head 40, provided the female member is initially longer than the thickness of the bundle 12. This protruding end is then cut flush with the outer surface 44 of the head portion 40 and the result is as shown in FIG. 4 from which it will be noted that at both ends the fastener extends only slightly beyond the thickness of the bundle.

Turning now to the alternative constructions shown in FIGS. 5 to 8, each of these figures shows the corresponding fastener in its assembled condition, and as so assembled the external appearance of the fastener is quite similar to the external appearance of the fastener 10 of FIGS. 1 to 4. All the various alternative constructions shown are or may be identical with the fastener 10 except for the shape of the coengaging surfaces of the male shank portion and the female shank portion. Therefore, in each of the alternative constructions, parts which are similar to parts of the fastener 10 of FIGS. 1 to 4 have been given the same reference numerals as in FIGS. 1 to 4 and will not be redescribed.

Figure 5:
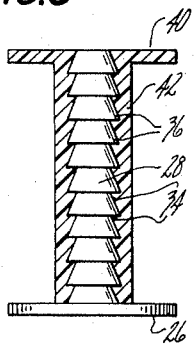
FIG. 5 is a view of an alternative embodiment of the present invention with the female member being shown in section and the male member in elevation.

Turning first to FIG. 5, this figure shows a fastener wherein the male and female shanks are designed so as to provide a very high resistance to disassembly of the male and female parts so that after assembly the parts are for all practical purposes permanently locked in the assembled state. As shown, the alternate reduced and enlarged diameter portions 34, 34 and 36, 36 in the male shank portion 28 are formed by a series of generally frusto-conical elements arranged axially as shown so that the small diameter end of one element is integrally joined with the large diameter end of the following element and so that the large diameter end of each element faces the head portion 26. Similarly, the opening in the female shank portion 52 has a complementarily shaped surface. The result is that the male shank is barblike so as to be capable of being easily inserted in the female member yet difficult or impossible to remove.

Figure 6:
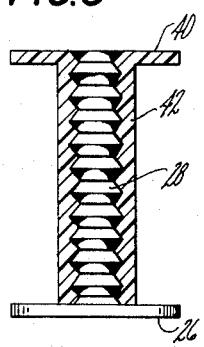
FIG. 6 is a view of still another alternative embodiment of the present invention with the female member being shown in section and the male member in elevation.

In the construction of FIG. 6, the enlarged and reduced diameter portions of the male and female shank portions are formed by generally V-shaped grooves axially spaced along the length of the shanks. The action of the fastener of FIG. 6 it will be understood is generally similar to that of FIGS. 1 to 4 since in going along the length of either shank portion there is a gradual rise from point of minimum diameter to the following point of maximum diameter and then a corresponding gradual fall from such point of maximum diameter to the following point of minimum diameter. Therefore, the parts may be disassembled with roughly the same amount of force as used in their assembly. In the construction of FIG. 5 the abrupt drop from one point of maximum diameter to the following point of minimum diameter, in going toward the associated head portion, results in the high resistance to disassembly.

Figure 7:
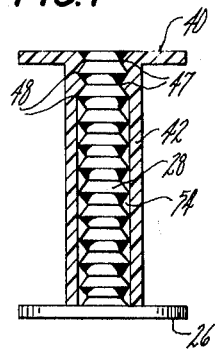
FIG. 7 is a view of a third alternative embodiment of the present invention with the female member being shown in section and the male member in elevation.

FIG. 7 shows another alternative construction of the present invention which is substantially similar to the construction of FIG. 6 except for the fact that the female member 20 has an axial opening therethrough which includes a number of alternative reduced and enlarged diameter portions 47, 47 and 48, 48, respectively, which occupy only a fraction of the length of the female member, the remainder of the length of the opening, as shown at 54, having a constant diameter approximately equal to the maximum diameter of the enlarged diameter portions of the male shank member 28. The reduced and enlarged diameter portions of the female member may be located along any lengthwise portion thereof, but preferably they are located adjacent the head portion 40 as shown so as to allow the female member to be cut to any desired length without removing any of said enlarged and reduced diameter portions. The provision of the reduced and enlarged diameter portions along only a fraction of the length of the female member has the sometimes desirable advantage of reducing the amount of force required to assemble and disassemble the male and female parts.

Figure 8:
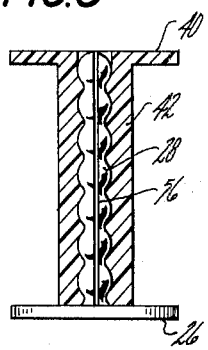
FIG. 8 is a view of a fourth alternative embodiment of the present invention with the female member being shown in section.

Preferably, at least one of the male or female members is made of a yieldable resilient plastic material to allow the parts to resiliently deform as required during the insertion of the male member into the female member. As shown in the construction of FIG. 8, however, at least one of the members (in the illustrated case the male member) may be provided with a longitudinal slot such as shown at 56 to allow additional yielding during assembly. The provision of such a slot permits the fastener members to be made of metal or other materials which otherwise would not have sufficient natural resilience to permit assembly of the parts.

The invention claimed is:

1. A fastening device for binding together a stack of sheets or the like having openings passing therethrough, said fastener comprising a male member and a female member each including a radially enlarged head and an axially elongated shank extending in one direction away from the associated head, said female member having an axially extending bore passing completely through its shank and its head, said bore and the outer surface of the shank portion of said male member each including an axially alternating series of enlarged and reduced diameter portions with said enlarged and reduced diameter portions of said female bore being complementary to said reduced and enlarged diameter portions of said male shank surface, said alternating series of enlarged and reduced diameter portions of said female bore and said male shank surface including axially inclined portions which coengage as said shank of said male member is pushed into said bore of said female member from the free end of said female shank to produce a wedging action tending to deform said members to permit the enlarged diameter portions of said male shank surface to pass through the reduced diameter portions of said female bore, at least one of said members being made from a resilient material to provide radial resilience in its shank and so as to therefore be deformable as a result of said wedging action to permit said male member shank to be axially pressed into said female member bore to any one of a number of positions at which reduced diameter portions of said male shank surface are axially aligned with enlarged diameter portions of said female bore, each of said male and female members being made from a relatively soft material so that both said male member shank and said female member shank may be readily cut to vary their lengths by removing portions therefrom, and said male member shank, said alternating series of enlarged and reduced diameter portions of said female member bore being located in a zone located adjacent the head of said female member, said bore between said zone and the end thereof remote from said female member head having a diameter at least as large as that of said enlarged diameter portions of said male shank, and said alternating series of enlarged and reduced diameter portions of said male shank extending along substantially the full length of said male shank having a length at least approximately as long as said female member so that in using said fastening device said female member may be cut to a length approximately equal to the thickness of said stack and said male member shank after being pressed as far as it will go into said female member bore will extend completely through said female member and will include a portion protruding beyond said head of said female member which protruding portion may be cut from the remainder of said male shank.

2. A fastening device for binding together a stack of sheets or the like having openings passing therethrough, said fastener comprising a male member and a female member each including a radially enlarged head and an axially elongated shank extending in one direction away from the associated head, said female member having an axially extending bore passing completely through its shank and its head, the shank portion of said male member including an axially alternating series of enlarged and reduced diameter portions extending along substantially its entire length, said bore of said female member having a zone adjacent the head of said female member including a number of reduced and enlarged diameter portions which are complementary to said enlarged and reduced diameter portions of said male shank and said bore between said zone and the end thereof remote from said female member head having a diameter at least as large as that of said enlarged diameter portions of said male shank, said alternating series of enlarged and reduced diameter portions of said female bore and said male shank including axially inclined portions which coengage as said shank of said male member is pushed into said bore of said female member from the free end of said female shank to produce a wedging action tending to deform said members to permit the enlarged diameter portions of said male shank surface to pass through the reduced diameter portions of said female bore, at least one of said male members being made from a resilient material to provide radial resiliency in its shank and so as to be deformable as a result of said wedging action to permit said male member shank to be axially pressed into said female member bore to any one of a number of positions at which reduced diameter portions of said male shank are axially aligned with enlarged diameter portion of said female bore, said shanks of both said male and female members being further made from a material which is readily severable so that the excess lengths thereof which exceed the combined sheet thicknesses may be readily cut therefrom.

References Cited by the Examiner

UNITED STATES PATENTS

| 1,171,098 | 2/1916 | Dalton | 85—4 |
| 1,374,713 | 4/1921 | Bell | 85—4 |
| 1,841,989 | 1/1932 | Smith | 85 4 |
| 2,017,261 | 10/1935 | Soden | 24—265.2 |
| 2,086,598 | 7/1937 | McIntyre | 85—5 |
| 2,132,950 | 10/1938 | Green | 85—4 |
| 2,381,204 | 8/1945 | Cardoza | 129—12 |
| 2,440,038 | 4/1948 | Baker et al. | 85—4 |
| 2,510,695 | 6/1950 | Guarnieri | 24—265.2 |
| 2,891,554 | 6/1959 | Foster | 85—5 |
| 3,094,892 | 6/1963 | Topf | 85—72 |

FOREIGN PATENTS 1,176,422   11/1958   France.

CARL W. TOMLIN, *Primary Examiner.*

M. HENSON WOOD, JR., EDWARD C. ALLEN,
*Examiners.*

M. PARSON, JR., *Assistant Examiner.*